Patented May 11, 1948

2,441,360

UNITED STATES PATENT OFFICE 2,441,360

PROCESS OF TREATING VINYL CHLORIDE-CONTAINING POLYMERS

Charles G. Kamin, Great Lakes, Ill., assignor to E. I. du Pont de Nemours & Company, Wilmington, Del., a corporation of Delaware No Drawing. Application October 18, 1944, Serial No. 559,237

4 Claims. (Cl. 260—88)

This invention relates to vinyl chloride-containing polymers, and more particularly it relates to a new and improved process for the stabilization against thermal decomposition of vinyl chloride-containing polymers, particularly polymers containing at least 50%, by weight, vinyl chloride ($CH_2$=CHCl) units.

Vinyl chloride-containing polymers, i. e., polymers obtained by the polymerization solely of vinyl chloride, or polymers obtained by the conjoint polymerization of vinyl chloride and another polymerizable substance, which contains 50% or more of vinyl chloride units have long been known to be subject to thermal decomposition when heat processed above the melting point thereof in the formation of various articles, for example, when heat molded, injection molded, heat calendared and the like. To minimize this thermal decomposition, which is evidenced by discoloration or embrittlement, or both, it has long been the practice to add compounding ingredients, known as stabilizers to the said polymers.

Of the previously known stabilizers for vinyl chloride-containing polymers some were employed by reason of their capacity to remove or deactivate certain impurities in the polymer, for example, ferric or cupric salts, which unless removed or deactivated, would tend to accelerate decomposition of the polymer. Other stabilizers were employed by reason of their capacity to accept or neutralize products of decomposition such as hydrogen chloride, which otherwise would increase the rate of decomposition. The previously known stabilizers consequently functioned only to retard the thermal decomposition. They did not counteract the effects of decomposition, or even completely halt decomposition of the above said polymers. For this reason there is usually some residual color in vinyl-chloride-containing polymers so stabilized against high temperature processing.

It is an object of this invention to provide a process for the stabilization of vinyl chloride polymers containing at least 50%, by weight, of vinyl chloride units which will not only halt thermal decomposition of the polymers but which will counteract the effects of decomposition which may previously have occurred.

It is another object of this invention to provide a process for the stabilization of vinyl chloride polymers containing at least 50%, by weight, of vinyl chloride units which will halt thermal decomposition of the polymers, and which will increase the resistance of said polymers to age embrittlement.

It is another object of this invention to produce clear, undiscolored, non-brittle articles of a vinyl chloride polymer by incorporating a stabilizing and discoloring agent in said polymer and heat processing the same to form the desired articles.

Other objects of the invention will appear hereinafter.

The objects of this invention are accomplished, in general, by thoroughly admixing and incorporating throughout the mass of a vinyl chloride polymer containing at least 50%, by weight, vinyl chloride units an N-chlorinated hydantoin. The N-chlorohydantoin containing vinyl chloride polymer may then be heat processed above the melting point thereof, for example, by heat molding, injection molding, calendaring or the like to form a clear, water-white article of manufacture.

The vinyl chloride polymers which are particularly subject to thermal decomposition by conventional processes of heat processing are those containing at least 50%, by weight, of vinyl chloride units. The present invention is, therefore, applicable especially to such polymers, and even more so to those containing 70% or more, by weight, of vinyl chloride units. The process of this invention may be applied to vinyl chloride polymers which are colorless and have never been subjected to heat processing, or it may be applied to vinyl chloride polymers which have previously been darkened or discolored by a thermal decomposition. In the former case, the N-chlorohydantoins will prevent discoloration or embrittlement, whereas in the latter case, they will, in addition, bleach or remove the discoloration and embrittlement caused by previous thermal decomposition.

The invention is applicable to vinyl chloride polymers consisting entirely of vinyl chloride units, i. e., polyvinyl chloride, or it is applicable to copolymers and interpolymers in which at least 50% of the polymer consists of vinyl chloride units and the remainder consists of other polymer units. As examples of copolymers which will be stabilized in accordance with the present invention, the following may be named: vinyl chloride-fumaric ester copolymers, vinyl chloride-vinyl acetate copolymers, vinyl chloride-vinyl cyanide copolymers, vinyl chloride-acrylic ester copolymers and vinyl chloride-methacrylic ester copolymers. Preferably, the polymers to be treated in accordance with this invention are those prepared from monomers which contain only one ethylenic double bond.

By the term "N-chlorinated hydantoin" is meant hydantoins in which at least one hydrogen atom attached to a nitrogen atom is replaced by a chlorine atom. As examples of N-chlorinated hydantoins which have been found to stabilize the vinyl chloride polymers in the above-described manner, the following may be named:

1,3-dichlorohydantoin
1,3-dichloro-5,5-dimethylhydantoin
1,3-dichloro-5-methyl-5-isobutylhydantoin
1,3-dichloro-5-methyl-5-ethyl hydantoin
1,3-dichloro-5-methyl-5-propyl hydantoin
1-monochlorohydantoin
1-chloro-5-methyl-5-ethyl hydantoin
3-chloro-5,5-dimethyl hydantoin
1-chloro-3-aluminum-5,5-dimethyl hydantoin
1-chloro-3-stannous-5-methyl-5-ethyl hydantoin Mixtures of two or more chlorohydantoins may be used with good results. Metal salts of the monochlorohydantoins which have a color of their own, for example, copper and lead salts, are of course objectionable for use in producing clear, uncolored resins.

The N-chlorohydantoin should be thoroughly and uniformly incorporated in the polymer in an amount between 0.1% and 10%, and preferably between 0.5% and 5%. This may be accomplished by the usual methods of mixing and blending, for example by use of a rubber-mill, a ball-mill, a Werner-Pfleiderer mixer or the like. The mixing or milling should be carried out for such a period of time as is necessary to obtain a homogeneous mass. The polymer composition may be modified by the addition of plasticizers, pigments, fillers, lubricants, and the like in the usual manner. It is, of course, preferred that the modifying agent be chosen from such substances as are not rapidly attacked by free chlorine.

The following detailed examples are given to illustrate certain preferred ways of carrying out the present invention, it being understood that the invention is not to be considered as limited by the specific details set forth in these examples.

*Example I*

| | Parts |
|---|---|
| A copolymer of vinyl chloride and diethyl fumarate (95% vinyl chloride-5% diethyl fumarate) | 100 |
| 1,3-dichloro-5,5-dimethyl hydantoin | 2 |

The above mixture was dry-ground in a mortar until fairly homogeneous. The powder was then pressed at 165° C. between chromium plates at 1000 lbs. per sq. in. for two minutes. The resulting molding was about 0.04 inch thick, of good clarity and substantially water white.

*Example II*

Following the procedure outlined in Example I, a molding was made from a second sample of the same copolymer of vinyl chloride and diethyl fumarate without the addition of stabilizer. The molding resulting from this procedure was yellowish brown in color corresponding to the Hellige varnish color standard number 15.

*Example III*

| | Parts |
|---|---|
| A copolymer of vinyl chloride and diethyl fumarate (95% vinyl chloride-5% diethyl fumarate) | 100 |
| Magnesium stearate (as lubricant) | 1 |
| 1,3-dichloro-5,5-dimethyl hydantoin | 2 |

After brief mixing, the above composition was milled between differential rolls maintained at 140–145° C. for two minutes, after which the mass was sheeted off and allowed to cool on a flat surface. A portion of this sheet was press-polished between chromium plates for two minutes at 165° C. and 1000 lbs. per sq. in. The resultant sheet was sparkingly clear and water white in color.

*Example IV*

| | Parts |
|---|---|
| Polyvinyl chloride | 100 |
| Magnesium stearate | 1 |
| 1-monochloro-5-methyl-5-ethyl hydantoin | 3 |

Upon milling and press-polishing as outlined in Example III, this composition yielded a substantially water white molding of excellent clarity.

*Example V*

| | Parts |
|---|---|
| A conjoint polymer of vinyl chloride and diethyl fumarate (95% vinyl chloride-5% diethyl fumarate) | 100 |
| Magnesium stearate | 1 |
| 1-chloro-3-aluminum-5,5-dimethyl hydantoin | 2 |

Upon milling and press-polishing as outlined in Example III, a molding of clarity and color comparable to that prepared in that example was obtained.

*Example VI*

| | Parts |
|---|---|
| A conjoint polymer of vinyl chloride and diethyl fumarate (95% vinyl chloride-5% diethyl fumarate) | 70 |
| Dibutyl phthalate | 30 |
| 1,3-dichloro-5,5-dimethyl hydantoin | 2.1 |

When this composition was milled between differential rolls maintained at 140–150° C. for two minutes and then molded in a stainless steel mold maintained at 160° C. for five minutes, a rubber-like, somewhat tacky molding was obtained which was of sparkling clarity and nearly water white. The color of the plasticizer used was such that a water white molding was not obtained.

*Example VII*

| | Parts |
|---|---|
| A heat darkened conjoint polymer of vinyl chloride and diethyl fumarate (95% vinyl chloride-5% diethyl fumarate) | 100 |
| 1,3-dichloro-5,5-dimethyl hydantoin | 3 |

The above composition was intimately mixed in a mortar and molded between chromium plates maintained at 165° C. for 2 minutes at 1000 lbs. per sq. in. The resulting molding was nearly water white. A simultaneous spot-molding of the darkened resin without the chloro hydantoin was nearly opaque and a deep reddish brown in color.

*Example VIII*

| | Parts |
|---|---|
| Vinyl chloride-vinyl acetate copolymer (95% vinyl chloride-5% vinyl acetate) | 100 |
| Magnesium stearate | 1 |
| 1,3-dichloro-5,5-dimethyl hydantoin | 2 |

The above ingredients were milled for 1½ minutes on differential rolls maintained at 140° C. The resulting milled sheet was press-polished between chromium plates for 2 minutes at 165° C. The sheet formed by this procedure was nearly water-white in color and sparkingly clear, while a similar molding of unstabilized copolymer was brown in color.

Example IX

| | Parts |
|---|---|
| Vinyl chloride-methyl acrylate copolymer (85% vinyl chloride-15% methyl acrylate) | 100 |
| Magnesium stearate | 1 |
| 1,3-dichloro-5,5-dimethyl hydantoin | 2 |

When the above composition was compounded according to the procedure outlined in Example VIII, a clear, water-white molding was obtained. When processed without stabilizer, this material was light amber colored.

Example X

| | Parts |
|---|---|
| After-chlorinated polyvinyl chloride | 20 |
| 1,3-dichloro-5,5-dimethyl hydantoin | 0.4 |

The resin powder was thoroughly mixed with the hydantoin in a mortar and pestle and was then molded for two minutes at 165° C. The sheet produced by this procedure was straw yellow in color. A simultaneous molding of unstabilized after-chlorinated polyvinyl chloride was black.

Example XI

| | |
|---|---|
| Vinyl chloride-methyl methacrylate copolymer (95% vinyl chloride-5% methyl methacrylate) grams | 20 |
| 1,3-dichloro-5,5-dimethyl hydantoin parts | 0.4 |

When processed according to the procedure outlined under Example X, a sparkling clear film resulted which was substantially water-white. A simultaneous molding of unstabilized copolymer was brown with green blotches.

Example XII

| | Parts |
|---|---|
| A 90-10 vinyl chloride-vinyl cyanide copolymer | 20 |
| 1,3-dichloro-5,5-dimethyl hydantoin | 0.6 |

After thoroughly mixing the above two components in a mortar, the homogeneous composition was molded, in the form of a film for 2 minutes at 165° C. The resultant film was light amber in color. A similar molding of unstabilized resin was darker amber with brown blotches.

The present invention provides an exceptionally efficient process for the stabilization of vinyl chloride-containing polymers against thermal decomposition. By the process of the present invention vinyl chloride-containing polymers can be heat molded or calendared to produce desired articles which are clear and substantially water white. The N-chlorohydantoin stabilizing and decoloring agents also preserve the above-said polymers against age-embrittlement. Furthermore, vinyl chloride-containing polymers which have been colored due to thermal decomposition can be reworked in accordance with this invention to produce substantially clear and colorless products and articles.

Throughout the specification and claims, reference to parts and proportions of materials refers to parts and proportions by weight, unless otherwise specified.

Since it is obvious that many changes and modifications can be made in the above-described details without departing from the spirit and scope of the invention, it is to be understood that the invention is not to be limited to said details except as set forth in the appended claims.

I claim:

1. The process of treating vinyl chloride-containing polymers subject to thermal decomposition under heat processing conditions which comprises admixing with and incorporating throughout the body of a vinyl chloride polymer containing at least 70% by weight of $$-CH-CH_2-$$
$$\phantom{-CH}|\phantom{-CH_2-}$$
$$\phantom{-CH}Cl$$

units, which polymer has been discolored by thermal decomposition, 0.1% to 10% of an N-chlorohydantoin, whereby said discoloration is removed from said polymer and the latter is stabilized against thermal decomposition by a heat processing operation.

2. The process of claim 1 in which the N-chlorohydantoin is 1,3-dichloro-5,5-dimethyl hydantoin.

3. The process of claim 1 in which the N-chlorohydantoin is 1,3-dichloro-5,5-diethyl hydantoin.

4. The process of claim 1 in which the N-chlorohydantoin is 1-monochloro-5-methyl-5-ethyl hydantoin.

CHARLES G. KAMIN.

REFERENCES CITED

The following references are of record in the file of this patent:

UNITED STATES PATENTS

| Number | Name | Date |
|---|---|---|
| 2,354,210 | Jacobson | July 25, 1944 |